Nov. 10, 1931.  I. R. HIPPENMEYER  1,831,352
BOTTLE WASHING MACHINE
Filed March 30, 1929   7 Sheets-Sheet 2
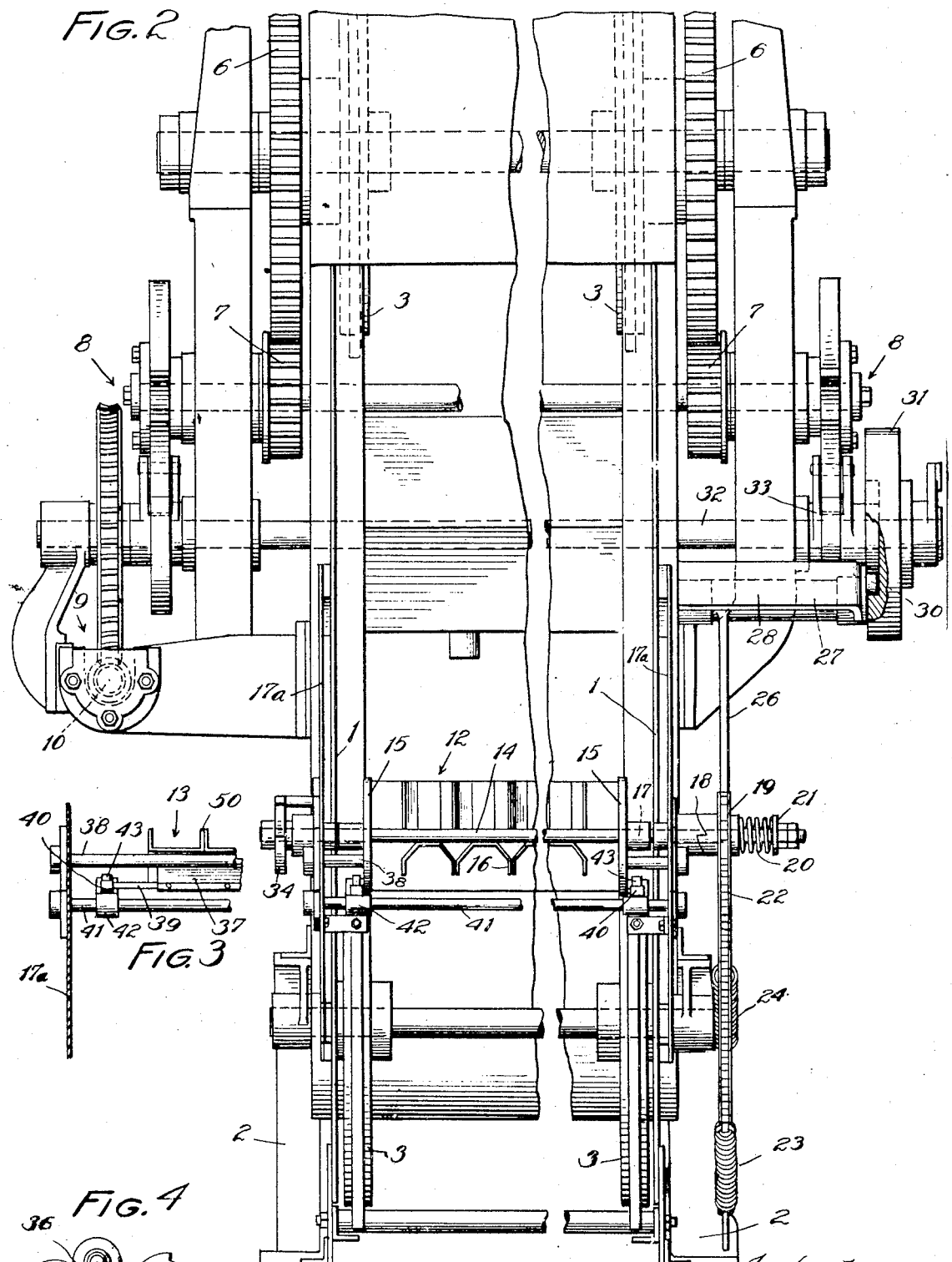
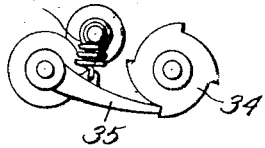
Inventor
Irving R. Hippenmeyer
by Hewitt S. Dixon
Atty Nov. 10, 1931.  I. R. HIPPENMEYER  1,831,352
BOTTLE WASHING MACHINE
Filed March 30, 1929   7 Sheets-Sheet 3
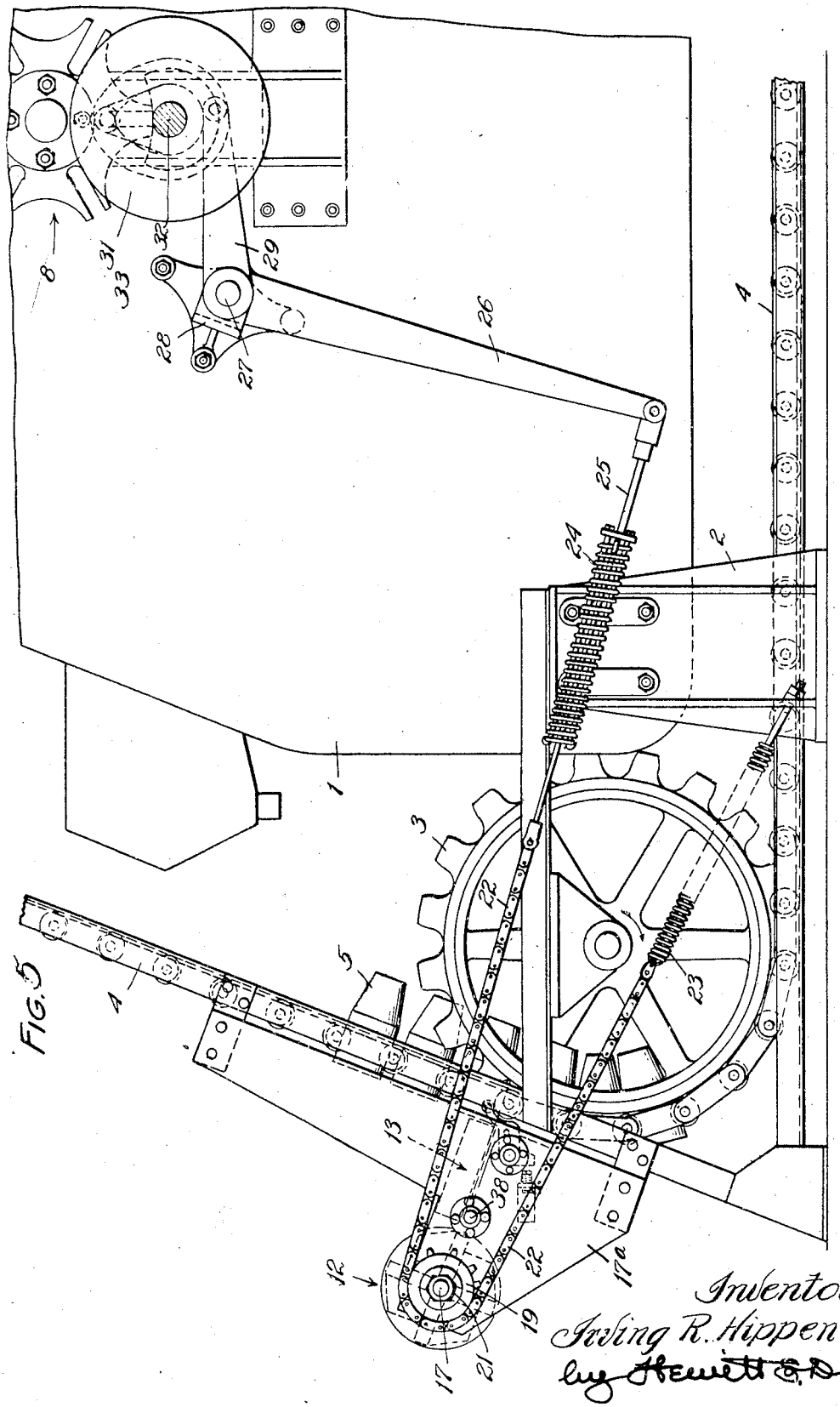

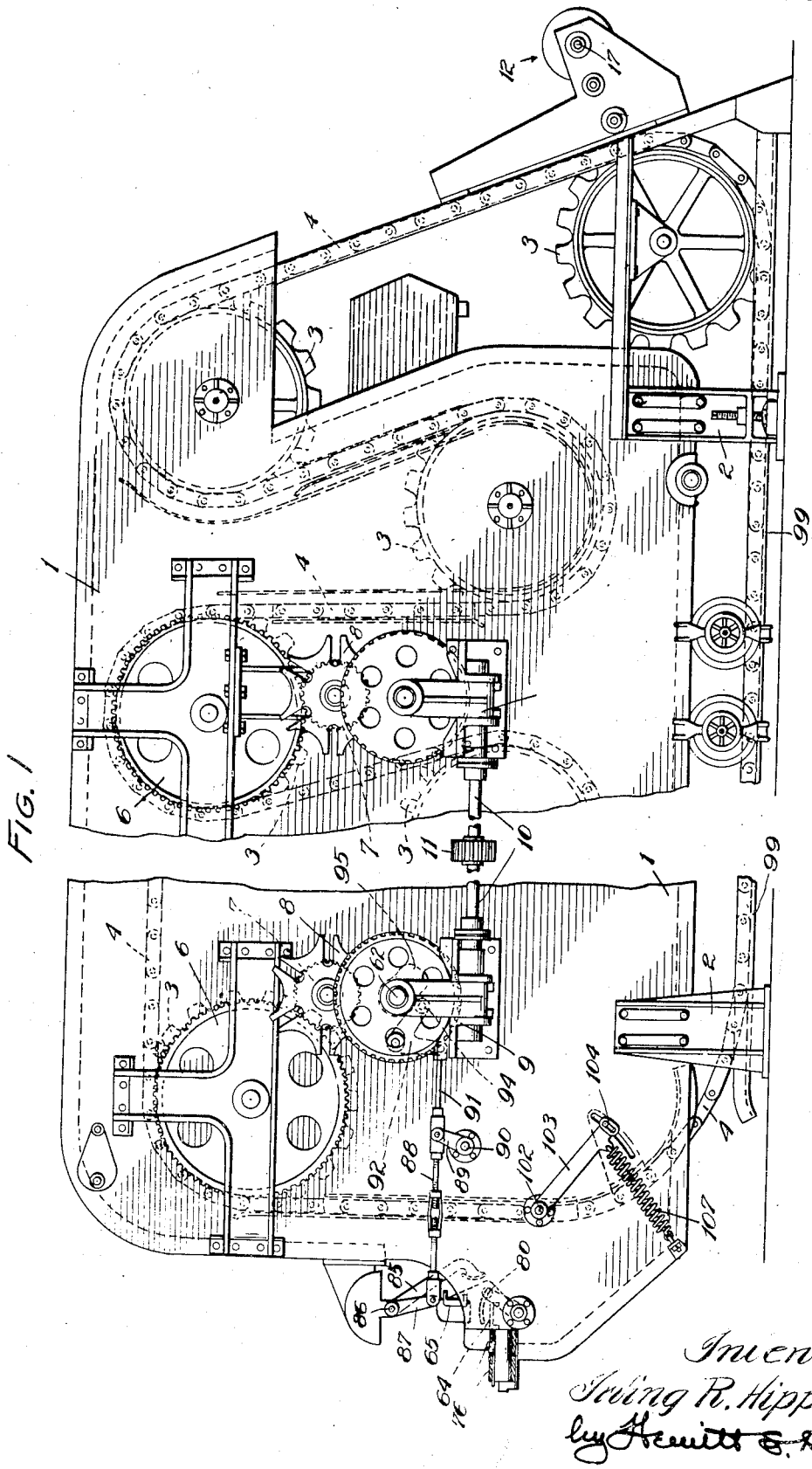

Nov. 10, 1931.  I. R. HIPPENMEYER  1,831,352
BOTTLE WASHING MACHINE
Filed March 30, 1929  7 Sheets-Sheet 4
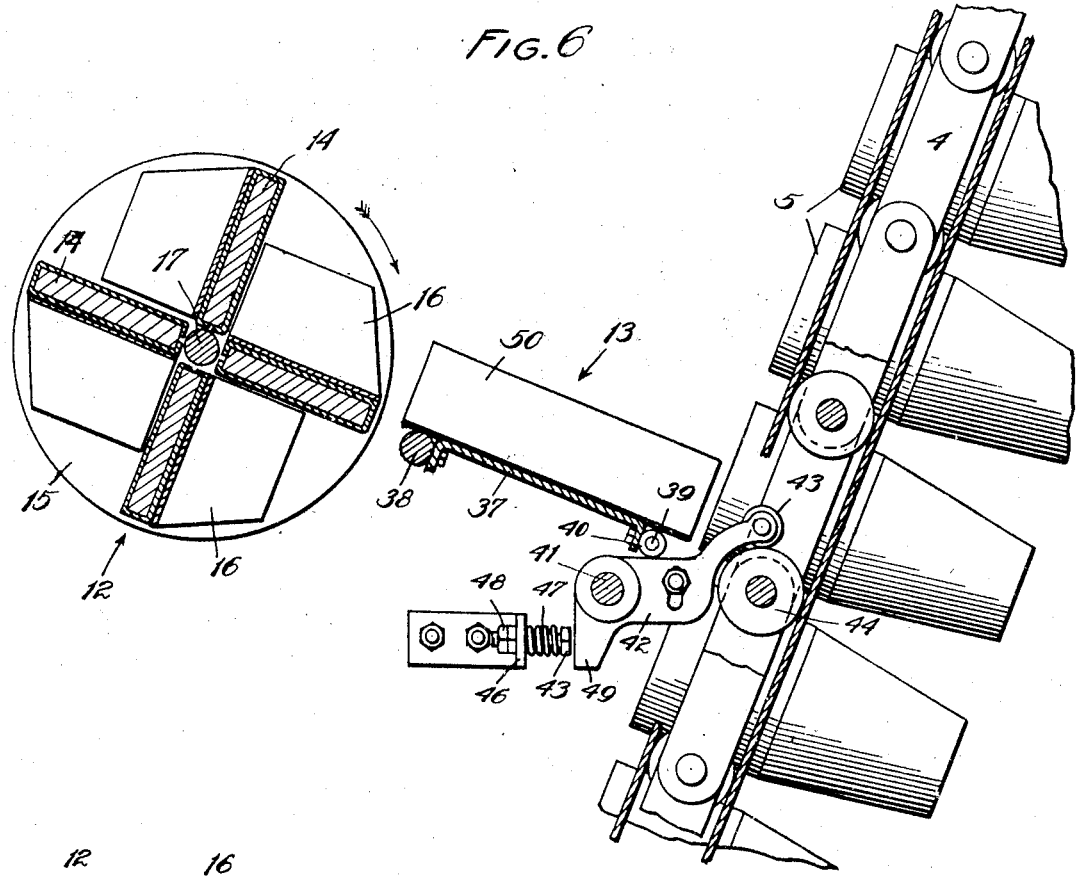
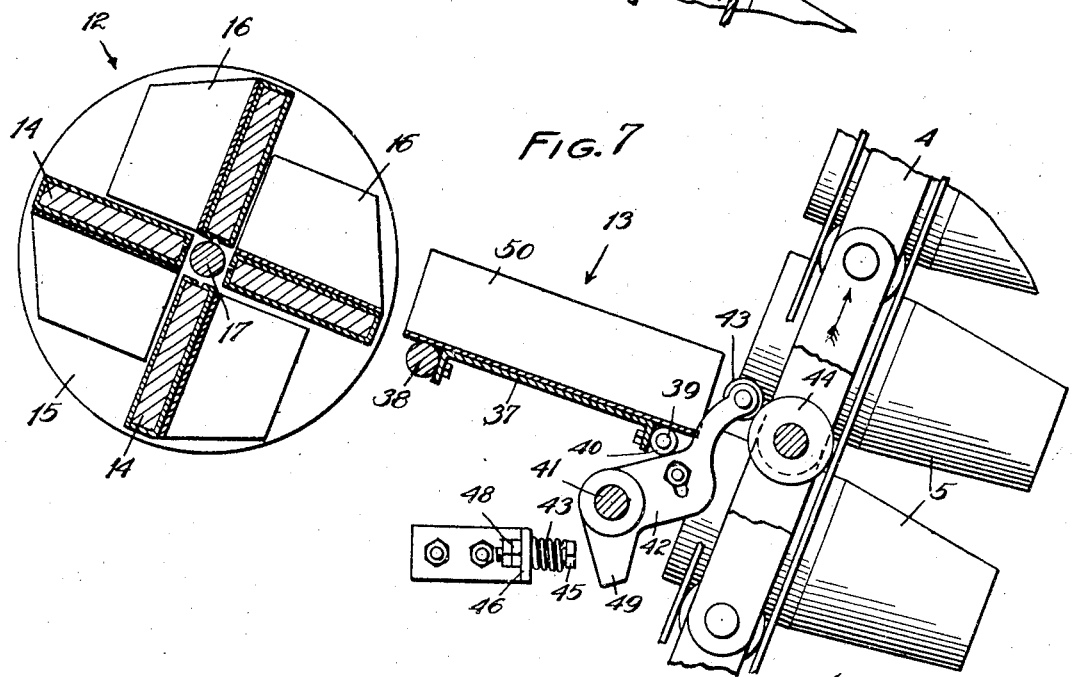
Inventor
Irving R. Hippenmeyer
by Hewitt & Dixon
Atty

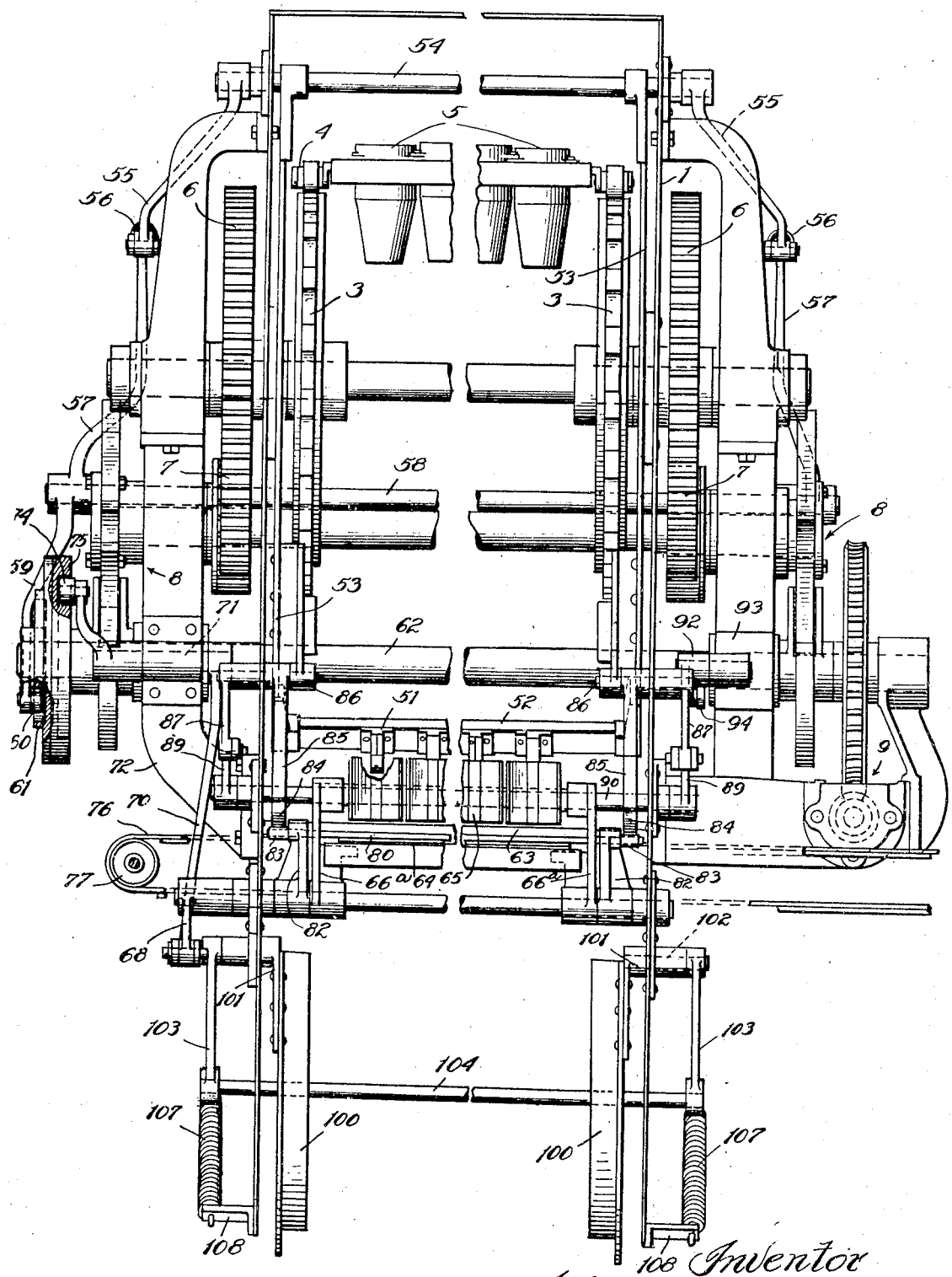

Nov. 10, 1931.  I. R. HIPPENMEYER  1,831,352
BOTTLE WASHING MACHINE
Filed March 30, 1929  7 Sheets-Sheet 6

Inventor
Irving R. Hippenmeyer
by Hewitt & Dixon
Atty

Nov. 10, 1931.   I. R. HIPPENMEYER   1,831,352
BOTTLE WASHING MACHINE
Filed March 30, 1929   7 Sheets-Sheet 7

Inventor
Irving R. Hippenmeyer
by Hewitt B. Dixon
Atty

Patented Nov. 10, 1931

1,831,352

UNITED STATES PATENT OFFICE

IRVING R. HIPPENMEYER, OF WAUKESHA, WISCONSIN, ASSIGNOR TO THE CREAMERY PACKAGE MFG. COMPANY, OF CHICAGO, ILLINOIS, A CORPORATION OF ILLINOIS

BOTTLE WASHING MACHINE

Application filed March 30, 1929. Serial No. 351,150.

The invention relates to bottle washing machines of the type having an endless conveyor comprising pockets in which the bottles are moved through a series of zones for cleansing treatment, and more particularly relates to loading and unloading mechanism for feeding the bottles into the conveyor pockets and discharging them therefrom.

An object of the invention is to provide improved automatic loading mechanism having automatically adjustable guides always in alinement with the bottle pockets positioned to receive bottles, thereby avoiding loss and damage occurring when bottles jam in the conveyor pockets with resultant breakage of bottles or machine.

Another object is to provide improved automatic unloading mechanism operable to turn the bottles into upright position and place them upon a belt conveyor, without toppling the bottles or otherwise causing damage.

A further object is to provide unloading mechanism capable of delivering the upright bottles upon two parallel belt conveyors simultaneously, for the service of a pair of bottle filling machines.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the spirit and scope of the invention as expressed in the appended claims.

Figure 9:
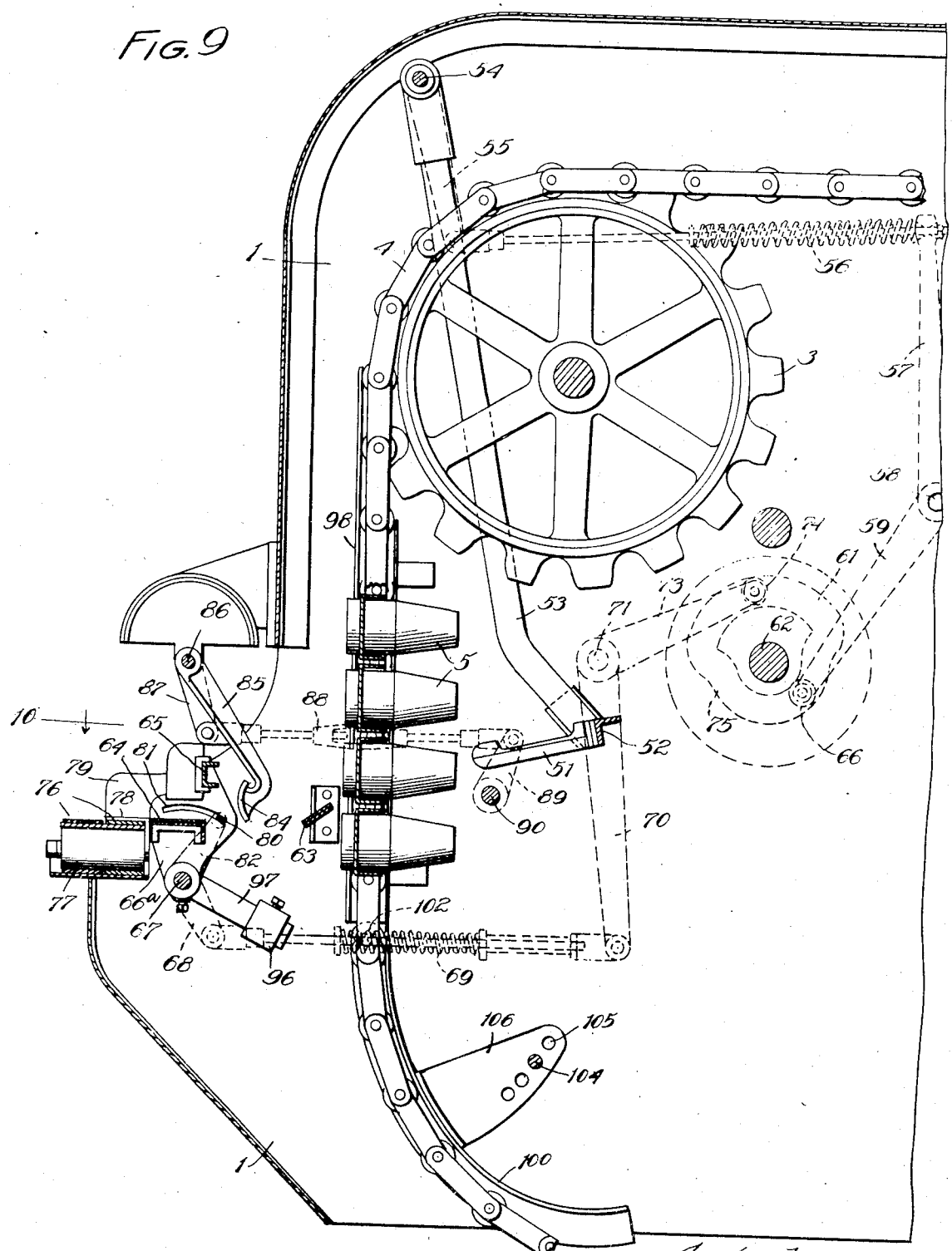
Figure 10:
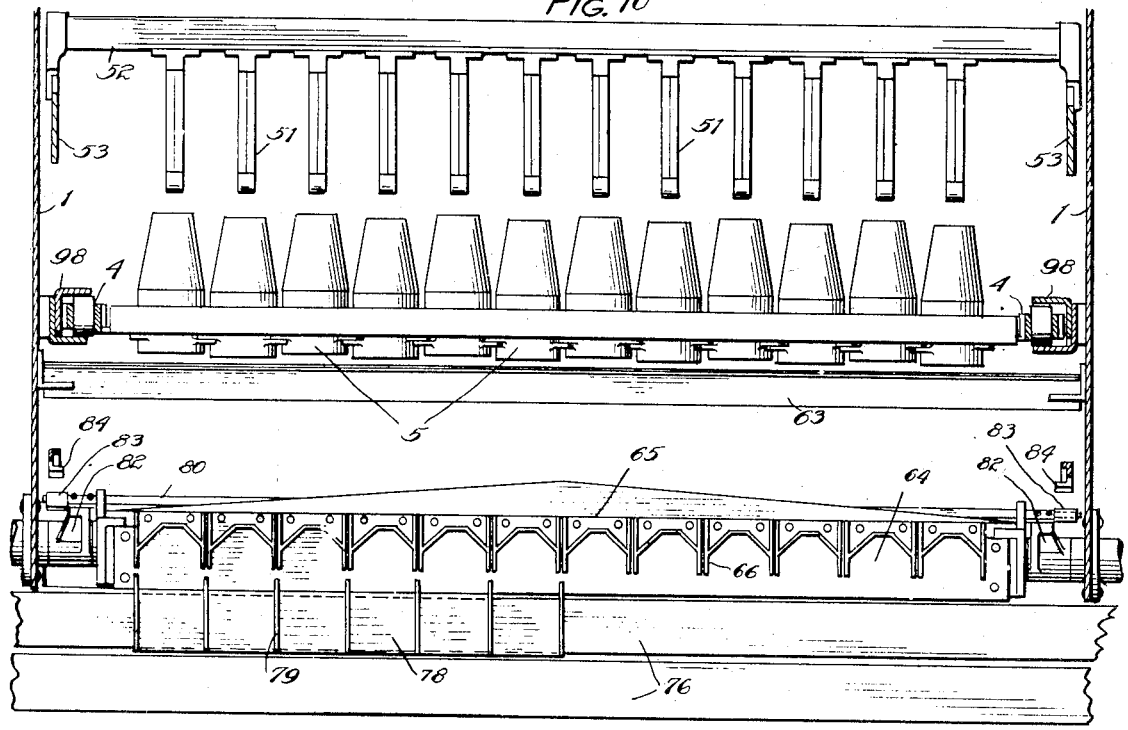
Figure 11:
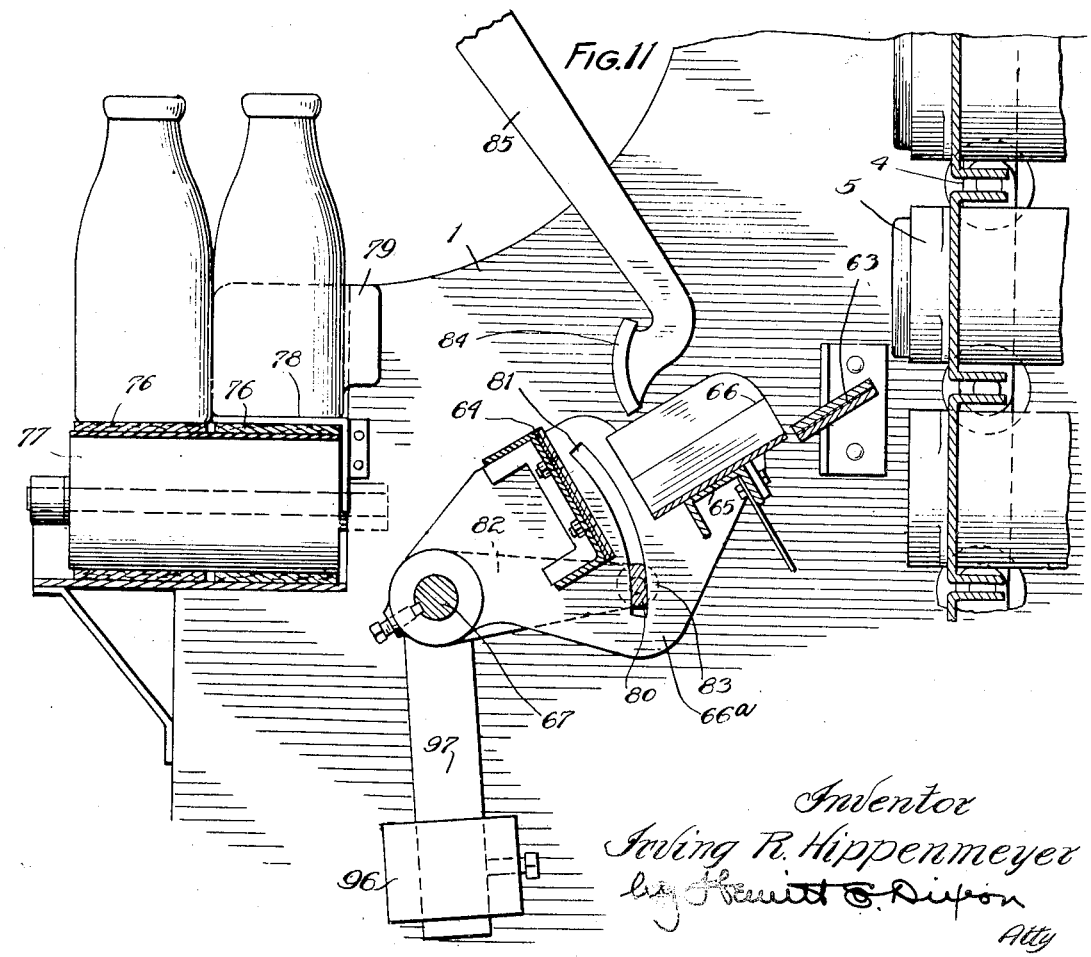

Referring to the drawings, Fig. 1 represents in side elevation the end portions of a bottle washing machine to which the invention appertains. Fig. 2 is a partial front end view in elevation of the machine in which the loading mechanism is incorporated. Figs. 3 and 4 being detailed views of parts of the same. Fig. 5 is a partial view in side elevation of the front end of the machine as seen on the side opposite to that shown in Fig. 1. Figs. 6 and 7 are cross sectional views of the operating elements taken on a vertical plane longitudinal of the machine. Fig. 8 is a partial rear end view in elevation of the machine in which the unloading mechanism is incorporated. Fig. 9 is a partial sectional view in side elevation of the rear end of the machine as seen on the same side as that shown in Fig. 1. Fig. 10 is a partial sectional view taken on the horizontal plane of the line 10— in Fig. 9. Fig. 11 is a partial sectional view taken on a vertical plane parallel to that of Fig. 9, and showing the parts in different operative relation to that shown in Fig. 9.

In the drawings, the numeral 1 indicates the outer walls of a tank structure which contains the bottle cleansing liquids and which supports the mechanisms for conveying the bottles through the structure and for applying the cleansing treatment. The tank is supported upon appropriate legs 2. A series of pairs of spaced sprockets 3, mounted upon suitable shafts having bearings in suitable brackets mounted on the side walls of the tank, support an endless bottle conveyor comprising a pair of chains 4 running over the several pairs of sprockets and carrying between them a continuous series of rows of bottle holders or pockets 5. The conveyor passes from the bottle loading station to the bottle unloading station through a series of compartments in the tank in operative association with a series of treatment applying mechanisms (not shown), and returns to the loading station outwardly of and beneath the bottom wall of the tank. The conveyor is driven in intermittent movement by the application of power to one or more of the pairs of sprockets. As illustrated herein, two of the upper sprocket-supporting shafts carry gears 6 mounted outwardly of the side wall of the tank, preferably on both sides of the machine, each of which is in driven engagement with a pinion 7 driven by a conventional Geneva stop mechanism 8, the latter being actuated respectively by conventional worm drives 9 having a common worm shaft 10 having a driving gear 11 arranged for driven connection with a prime mover (not shown).

The above described structure is typical of well known bottle washing machine construction, and further detailed description or illustration thereof is deemed not necessary to those familiar with the art for a full understanding of the present invention as described hereinafter.

The automatic loading mechanism (see Figs. 1 to 7) comprises a multiple-compartment loading table 12 intermittently rotatable on a horizontal axis, in time with the movement of the conveyor, to deliver the bottles by gravity into the successive rows of bottle pockets 5, and a guiding device 13 bridging the space between the loading table and the conveyor pockets, the guiding device being automatically alined with the pockets as the latter are stopped successively in position to receive the bottles. The rotary loading table 12 is constructed preferably with four radially arranged bottle supporting plates 14 endwardly supported upon end plates 15 and carrying lateral bottle spacing members 16, the whole being mounted on an axial shaft 17 having pivotal support in the side members 17a of a suitable frame structure for the loading mechanism.

Intermittent partial rotation of the shaft and the loading table is accomplished by means of a ratchet clutch 18 (Fig. 2), one member of which is fixed upon the shaft 17 and the other member being fixed upon a free running sprocket 19 supported on the shaft 17. Axially outward of the sprocket 19 is a spring 20 confined between the sprocket and a retainer 21 secured on the extended end of the shaft 17, the spring 20 tending to hold the members of the clutch 18 in operative engagement. The sprocket 19 is actuated by a chain belt 22 attached at one end to an extensible spring 23 anchored to one of the legs 2. The other end of the chain 22 is connected through a conventional spring cushioning member 24 and link 25 to one arm 26 of a bell crank, the latter being operatively supported on a stub shaft 27 mounted in a bracket 28 secured to the side wall of the machine. The other arm 29 of the bell crank carries a roller 30 in operative engagement with a grooved face cam 31 mounted on the extended end of the shaft 32 which actuates the driving member 33 of the Geneva mechanisms, the cam and driving member being in fixed relation. The groove in the cam 31 is formed to throw downward and return the lever arm 29 while the Geneva star wheel is at rest, thus operating the loading mechanism while the bottle conveyor is at rest.

The first movement of the bell crank arms 29 and 26 causes a reverse run of the chain belt 22 by contraction of the spring 23, thereby reversely rotating the outer member of the ratchet clutch 18 while the loading table and its shaft 17 are held stationary by a ratchet and pawl device (see Fig. 4) of which a ratchet wheel 34 is fixed on the opposite end of the shaft 17, a pawl 35 being resiliently held in engagement with the ratchet wheel by a spring 36, the pawl and spring being suitably supported on brackets mounted on the adjacent frame member 17a. The return movement of the bell crank arms imparts a forward movement to the chain belt 22 against the tension of the spring 23, and by operative engagement of the members of the ratchet clutch 18 causes the shaft 17 and loading table 12 to rotate through a quarter of a turn.

It will here be obvious that with a row of bottles placed by an attendant upright in the uppermost compartment of the loading table, positioned as shown in Fig. 6, a quarter turn inwardly of the loading table will turn the bottles onto their sides and at an angle which causes them to slide by gravity from the loading table over the guiding device 13 and into the conveyor pockets 5. Thereafter the conveyor is advanced by one row of pockets, the attendant meanwhile placing another row of bottles on the loading table, and the loading operation is repeated.

The guiding device 13 comprises a plate 37 extending parallel to the axis of the loading table 12, and positioned between the loading table and the path of the conveyor pockets 5. The upper edge of the plate 37 is secured to a supporting bar 38 of which the ends are pivotally supported on the frame members 17a (see Fig. 3). To the lower edge of the plate 37 is secured a rod 39, the respective ends of which carry rollers 40. Another pivoted bar 41 has end bearings on the frame members 17a, the bar 41 having a pair of levers 42 mounted thereon which respectively extend beneath and support the rollers 40 and rod 39, and thereby support the lower portion of the plate 37. The levers 42 extend into the path of the respective side chains 4 of the bottle conveyor, and are provided with rollers 43 for contact with the rollers 44 of the chains. The latter being spaced equally with the spacing of the rows of bottle pockets in the conveyor, the levers 42 are so shaped that with the progressive movement of the chains the rollers 43 successively engage and move with the rollers 44 thereby lifting the levers 42 and causing proportionate elevation of the adjacent lower edge of the plate 37. By this arrangement the lower edge of the plate 37 is moved into alinement with the lower edges of the successive rows of bottle pockets as they come to a stop in position to receive bottles. Fig. 6 represents the parts in alinement when the conveyor is at rest, and Fig. 7 illustrates the movement of the parts as the conveyor is advancing another row of pockets. A cushioning stop is provided to limit the drop of each of the levers 42 in passing from one to the next of the chain rollers, and comprises preferably a bolt 45 freely mounted in a bracket 46 secured to the frame members 17a and confining a compression spring 47 between its head and the bracket, the position of the bolt head being variable by adjustment of the nuts 48. An extension 49 of each lever 42 is adapted to abut the adjacent bolt head when the roller 43 is free of the rollers 44. In order to guide the bottles into the pockets in properly spaced relation, a series of spacing members 50 are mounted upon the plate 17 and serve as lateral guides for the bottles passing over the plate.

It will now be apparent that when each successive row of bottle pockets in the conveyor is moved into loading position and movement of the conveyor is arrested, whatever variations in position may occur by reason of wear in the chain links with consequent increase of spacing between rows of pockets, or other cause, such variations are compensated for by the exact alinement of the guiding device with the pockets, and thereby is avoided any jamming of the bottles in entering the bottle pockets.

The automatic unloading mechanism (see Figs. 1 and 8 to 11) comprises, with means for ejecting the bottles from the conveyor pockets, a novel bottle transferring mechanism which receives the ejected bottles, carries them into upright position, and places them upon one or both of a pair of bottle conveyor belts for delivery to filling machines. After having traveled through the several stations in the machine for applying cleansing treatment to the bottles, the rows of bottle pockets comprising the conveyor are successively presented at the unloading station at the rear end of the machine, and the bottles ejected therefrom while the movement of the conveyor is arrested. The ejection of the bottles from the conveyor pockets is accomplished by a series of ejector fingers 51 spaced similarly to the bottle pockets and adapted to enter the pockets at one end and push the bottles out of the other end. The ejectors 51 are attached to a cross bar 52 supported at its ends by a pair of swinging arms 53 secured to a rock shaft 54 having its bearings in the side walls of the machine. The shaft 54 is actuated by a pair of crank arms 55, each connected by a resiliently compressible link structure 56 to one of a pair of crank arms 57 secured on a shaft 58 having its bearings in the side walls of the machine. One of the arms 57 forms part of a bell crank of which the other arm 59 endwardly carries a roller 60 in operative engagement with a grooved face cam 61 mounted on the driver shaft 62 of one of the Geneva stop mechanisms 8. The cam 61 is designed to operate the train of crank levers effectively to move the ejector fingers 51 into and out of the conveyor pockets successively while the latter are at rest in unloading position, the relative movements of the conveyor and of the fingers being controlled in synchronism by the Geneva drive mechanism.

As the bottles are ejected from the conveyor, they slide by gravity into the transferring mechanism to be righted and placed upon the belt conveyors. Adjacent the path of movement of the conveyor pockets and immediately below the unloading position for the successive rows, is an inclined stationary bridge member 63 positioned to first receive the bottles pushed out of the pockets and guide them into the transferring mechanism. The bridge member 63 is suitably supported at its ends upon the side walls of the tank.

The transferring mechanism comprises a bottle supporting base plate 64 against which the bottoms of the bottles come to rest upon entering the mechanism, and a lateral bottle supporting structure 65 spaced from the base plate and having a series of bottle spacing members 66 extending perpendicularly to the base plate and forming trough-like receptacles for the bottles passing over the bridge member 63. The base plate 64 and support 65 are rigidly secured at their respective ends to a pair of swinging end brackets 66ª rigidly secured upon a rock shaft 67 having suitable bearings in the side walls of the machine. Outwardly of the tank the shaft 67 carries rigidly attached thereto a crank 68 connected by a resiliently compressible link structure 69 to another crank 70 fixed on a short shaft 71 having its bearing in one of the side bearing brackets 72 mounted on the side of the machine. The shaft 71 has fixed thereon also a crank arm 73 carrying at its outer end a roller 74 operatively engaged with a grooved face cam 75 mounted on the driver shaft 62 of the Geneva mechanism. The cam 75 is designed to operate its train of crank levers effectively to swing the bottle receiving members 64 and 65 into lowered position, as illustrated in Fig. 11, during the operation of the ejecting fingers 51 while the conveyor pockets are at rest, and to swing the same members into upright position, as illustrated in Figs. 8 to 10, while the conveyor is in motion to advance another row of pockets to the unloading station, the bottles being carried into upright position at rest upon the base plate 64.

Laterally adjacent the base plate 64 in upright position is a bottle conveyor of belt type, preferably comprising two parallel belts 76, adapted to receive bottles transferred from the base plate, as hereinafter described, and convey them to filling machines (not shown). A roller 77, having suitable support on the machine frame, provides support for the belts at one end of their operative run. The outer one of the belts 76 is loaded by passing the bottles over the inner belt upon a stationary bridge plate 78 having bottle spacing cross guides 79 and suitably supported upon the frame.

The bottles are transferred from the base plate 64 to the two belts 76 by means of a pusher bar 80 operable across the face of the plate 64, when the latter is in upright position, to push the bottles laterally onto the inner belt 76 and onto the bridge plate 78, the succeeding lot of bottles pushing those on the plate 78 over onto the outer belt 76. The speed of the belts being half that of the rate of delivery of bottles from the machine, each delivered lot of bottles will be moved by the belts half the total length of the transferring mechanism when the next succeeding lot is delivered, thus maintaining a continuous line of bottles on both belt conveyors. The pusher bar 80 moves through arcuate slots 81 in the end brackets 66a, the bar being endwardly supported and actuated by a pair of swing arms 82 having loose bearing support on the shaft 67. The free ends of the respective arms 82 carry rollers 83 positioned for engagement by a pair of shoes 84 carried by a pair of rocker arms 85 rigidly mounted on a pair of short shafts 86 having suitable bearings in the opposite side members of the machine frame. Outwardly of the frame members, a pair of crank arms 87 are rigidly mounted on the respective shafts 86, and are connected by adjustable links 88 to another pair of crank arms 89 rigidly mounted on a rock shaft 90 having suitable bearings in the side walls of the machine. A third link 91 also pivotally connected to the crank arm 89, extends into connection with one arm of a bell crank 92 (see Figs. 1 and 8) having pivotal support on a side bearing bracket 93, the other arm of the bell crank carrying a rolled 94 in operative engagement with a cam 95 rigidly mounted on the Geneva driver shaft 62. The cam 95 is designed in relation to cam 75 on the same shaft to operate its train of connections to the swinging shoes 84 effectively to cause the latter to engage the roller 83 and move the pusher bar 80 across the face of the base plate 64 immediately after the base plate has reached upright position, thus pushing the bottles therefrom onto the belts 76. Upon withdrawal of the shoes 84, the bar 80 is returned to normal retracted position by means of a weight 96 mounted on an arm 97 rigidly secured on the shaft 67.

In order to take up any undue amount of slack in the bottle conveyor chains 4 resulting from wear in the chain link bearings, automatically adjustable sections of chain bearing rails are provided. In passing through the unloading station, the bottle conveyor is guided by channel rails 98 (see Figs. 9 and 10) secured to the opposite side walls of the machine and respectively receiving the conveyor chains 4. Beneath the tank are other guide rails 99 for supporting the chains 4 during the return run of the conveyor to the loading station at the front end of the machine. Intermediate of the rails 98 and 99, a pair of curved conveyor chain guide rails 100 (see Figs. 8 and 9) are pivotally supported with their upper ends in continuation of the rails 98. (For clarity of rearward disclosure, rails 98 are omitted from Fig. 8.) The rails 100 are respectively mounted on a pair of brackets 101 secured upon a pair of short shafts 102 having suitable bearings in the side walls of the machine. Secured upon the outer ends of the respective shafts 102 are a pair of arms 103 having a removable bar 104 connecting their swinging ends through slots in the machine walls. The bar 104 is selectively positioned in one of several holes 105 provided in each of a pair of plates 106 rigidly attached to the swinging rails 100. A pair of springs 107 are attached respectively at one end to the arms 103 and at the other end to stationary brackets 108 mounted on the walls of the machine, the springs tending to swing the rails 100 outwardly against the supported conveyor chains, thereby taking up whatever slack otherwise would be present in the conveyor.

I claim as my invention:

1. In a bottle washing machine, a series of interconnected rows of bottle pockets forming a conveyor intermittently operable to successively position said rows of pockets at a loading station, a loading table adapted to receive bottles and operable intermittently to release said bottles for movement into said conveyor pockets, guiding means for said bottles between said table and said pockets, and automatic means for moving the bottle supporting face of said guiding means into position of alinement with bottle retaining surface of the successive rows of pockets presented at said loading station.

2. In a bottle washing machine, serially connected rows of bottle pockets forming a conveyor intermittently operable to successively position said rows of pockets at a loading station, a rotatable table having a plurality of circumferentially arranged bottle receiving compartments, means for intermittently rotating said table to successively position said compartments for the release of the bottles therein for movement into said conveyor pockets by gravity, and automatically adjustable guiding means for said bottles positioned between said table and said conveyor pockets.

3. In a bottle washing machine, a series of rows of bottle pockets forming a conveyor operable to successively position said rows of bottle pockets at a loading station, a loading table operable periodically to release bottles for movement into said pockets, means for guiding the bottles in their movement into said pockets, and means operatively associated with said conveyor and said guiding means for automatically alining said guiding means with the successive rows of pockets at said loading station.

4. In a bottle washing machine, a conveyor including a series of rows of bottle pockets, said conveyor being operable to position said rows of pockets successively at a loading station, means for guiding bottles moving into said pockets at said loading station, and a loading table comprising a plurality of bottle supporting plates arranged about a horizontal common axis, said table being rotatable to successively position said plates for receiving and retaining bottles placed thereupon and to successively position said plates for discharging said bottles by gravity over said guiding means into said pockets.

5. In a bottle washing machine, a conveyor including a series of spaced rows of bottle pockets and having connected supporting means for said pockets including elements spaced equally with the spacing of said rows of pockets, said conveyor being operable to position said rows of pockets successively at a loading station, a bottle guiding member positioned adjacent the path of said pockets at said loading station and having a pivotal support, a pivoted lever having its free end extending into the path of movement of said conveyer elements, and an operative connection between said lever and said guiding member, whereby the movement of said lever by said elements successively causes the movement of said guiding member in maintained alinement with said bottle pockets successively.

6. In a bottle washing machine, a conveyor comprising a spaced series of rows of bottle pockets and a pair of chain belts supporting said rows of pockets, said chain belts including rollers spaced equally with the spacing of said rows of pockets, said conveyor being intermittently operable to move said rows of pockets successively into position for loading bottles thereinto, a bottle guiding plate having one edge adjacent the path of movement of said pockets approaching said loading position, a pivotal support for the remote edge of said guiding plate, a pair of levers pivotally supported at one end and having their other ends extending into the paths of movement of said chain belts respectively for engagement successively by said rollers, a pair of elements extending from the adjacent edge of said guiding plate having operative engagement with said levers in support of the adjacent edge of said guiding plate, whereby upon the approach of the successive rows of pockets to said loading position the adjacent pairs of said rollers engage said levers and cause the adjacent edge of said guiding plate to follow in alinement with the successive rows of pockets, and means for depositing bottles on said guiding plate when said pockets are in loading position.

7. In a bottle washing machine, a bottle conveyor having serial rows of bottle pockets and operable to position said rows of pockets successively at an unloading station, means for ejecting bottles from the pockets positioned at said unloading station, a conveyor adapted to receive bottles placed uprightly thereupon, and a bottle transferring device comprising a base plate for supporting the bottoms of bottles, a lateral bottle support spaced from said base plate, said base plate and said lateral support having a common support swingable to move said base plate and said lateral support into position to receive bottles ejected from said pockets and into position to support said bottles erectly and laterally adjacent said belt conveyor, and a bar swingable with said common support and operable between said base plate and said lateral support to laterally push said bottles from said base plate onto said conveyor when said base plate is adjacent said conveyor.

8. In a bottle washing machine, a bottle transferring device comprising a rock shaft, a base plate for supporting the bottoms of bottles, a lateral bottle support spaced from said base plate, said base plate and said lateral support having common support upon and being actuated in swinging motion by said rock shaft, a bar movable transversely of said base plate and having a support loosely mounted on said rock shaft, and means for periodically engaging said bar and moving it across said base plate.

9. In a bottle washing machine, a bottle conveyor, means for successively ejecting bottles from said conveyor, another bottle conveyor, and a bottle transferring device positioned between said conveyors comprising a bottom support for bottles, a lateral support for bottles, a reciprocatory supporting structure for said bottom support and said lateral support operable to move said supports into position to receive and retain bottles ejected from said first conveyor and to move said supports into laterally adjacent relation to said second conveyor, a bar carried by said supporting structure and independently movable across the face of said bottom support to push bottles therefrom onto said second conveyor, and a reciprocatory member operable to engage and actuate said bar when said bottom support is positioned adjacent to said second conveyor.

In witness whereof I have hereunto attached my signature.

IRVING R. HIPPENMEYER.